United States Patent
Esakki et al.

(10) Patent No.: US 9,188,028 B2
(45) Date of Patent: Nov. 17, 2015

(54) GAS TURBINE SYSTEM WITH REHEAT SPRAY CONTROL

(71) Applicant: General Electric Company, Schenectady, NY (US)

(72) Inventors: Lakshmanan Esakki, Karnataka (IN); Mahendhra Muthuramalingam, Karnataka (IN)

(73) Assignee: General Electric Company, Schenectady, NY (US)

( * ) Notice: Subject to any disclaimer, the term of this patent is extended or adjusted under 35 U.S.C. 154(b) by 206 days.

(21) Appl. No.: 13/645,531

(22) Filed: Oct. 5, 2012

(65) Prior Publication Data

US 2014/0096535 A1    Apr. 10, 2014

(51) Int. Cl.
*F01K 23/10*    (2006.01)
*F01K 13/02*    (2006.01)

(52) U.S. Cl.
CPC .............. *F01K 23/10* (2013.01); *F01K 13/02* (2013.01); *Y02E 20/16* (2013.01); *Y02E 20/18* (2013.01)

(58) Field of Classification Search
CPC ..... F01K 23/10; F01K 23/106; F01K 23/108; F01K 13/02; F01K 23/101; F22B 1/1815; F02C 6/18; F05D 2260/606
USPC .................................... 60/783, 39.182, 39.17
See application file for complete search history.

(56) References Cited

U.S. PATENT DOCUMENTS

| | | | |
|---|---|---|---|
| 5,365,730 A | 11/1994 | Brueckner et al. | |
| 6,829,898 B2 * | 12/2004 | Sugishita | 60/772 |
| 8,104,283 B2 * | 1/2012 | Cheng et al. | 60/653 |
| 8,359,868 B2 * | 1/2013 | Conchieri | 60/772 |
| 2002/0194832 A1 | 12/2002 | Smith | |
| 2010/0031624 A1 | 2/2010 | Austin et al. | |
| 2011/0099972 A1 | 5/2011 | Yang et al. | |
| 2011/0260113 A1 | 10/2011 | Anand et al. | |
| 2011/0314819 A1 | 12/2011 | Muthuramalingam et al. | |
| 2013/0098313 A1 | 4/2013 | Pang | |

FOREIGN PATENT DOCUMENTS

EP    1331366 A2    7/2003

OTHER PUBLICATIONS

Search Report from GB Application No. 1317605.2 dated Apr. 16, 2014.

* cited by examiner

*Primary Examiner* — Phutthiwat Wongwian
*Assistant Examiner* — Jason H Duger
(74) *Attorney, Agent, or Firm* — Sutherland Asbill & Brennan LLP

(57) ABSTRACT

The present application provides a gas turbine system. The gas turbine system may include a gas turbine engine producing a flow of exhaust gases, a heat recovery steam generator with a reheater and an evaporator in communication with the flow of exhaust gases, and a gas flow control system for diverting a first portion of the flow of exhaust gases away from the reheater and towards the evaporator.

18 Claims, 3 Drawing Sheets

GAS TURBINE SYSTEM WITH REHEAT SPRAY CONTROL

TECHNICAL FIELD

The present application and the resultant patent relate generally to gas turbine engines and more particularly relate to a gas turbine system such as a combined cycle system with a gas flow control system that diverts a portion of the flow of exhaust gases away from the reheaters during hot ambient conditions and/or partial load operations.

BACKGROUND OF THE INVENTION

Generally described, a combined cycle system uses the combination of a gas turbine and a steam turbine to produce electrical power. Specifically, a gas turbine cycle may be operatively combined with a steam turbine cycle by way of a heat recovery steam generator and the like. The heat recovery steam generator is a heat exchanger that allows feed water for the steam generation process to be heated by the hot combustion gases of the gas turbine exhaust. The primary efficiency of the combined cycle system arrangement is the utilization of the otherwise "wasted" heat of the gas turbine engine exhaust. Specifically, the efficiency of the heat recovery steam generator focuses on the heat transfer between the gas turbine combustion gases ("the hot side") and the feed water and the steam ("the cold side"). The goal is to use as much of the heat and pressure of the gas turbine combustion gases as possible to provide useful work.

Although a combined cycle system is efficient, there are numerous types of parasitic losses involved in overall system operation. During hot ambient conditions at partial load, for example, the temperature of the exhaust gases from the gas turbine also may be higher. These higher temperatures generally may require more water to be sprayed into a reheat attemperator so as to control the temperature of the steam exiting the reheaters. This additional water/steam, however, bypasses the high pressure turbine without producing useful work so as to reduce overall system performance. The extra amount of water sprayed during partial load performance may be a multiple of the reheat spray at base loads such that any reduction may have a significant impact on overall performance.

There is thus a desire for an improved combined cycle power plant or other type of gas turbine system with reduced parasitic losses and operating losses. Preferably, the amount of water required for the reheat attemperator and similar components may be controlled during partial load operations and/or during other conditions so as to improve overall performance and efficiency.

SUMMARY OF THE INVENTION

The present application and the resultant patent thus provide a gas turbine system. The gas turbine system may include a gas turbine engine producing a flow of exhaust gases, a heat recovery steam generator with a reheater and an evaporator in communication with the flow of exhaust gases, and a gas flow control system for diverting a first portion of the flow of exhaust gases away from the reheater and towards the evaporator.

The present application and the resultant patent further provide a method of operating a gas turbine system. The method may include the steps of flowing exhaust gases through a heat recovery steam generator, flowing attemperating water to control a steam temperature of a flow of steam through one or more reheaters in the heat recovery steam generator, in response to an increase in an exhaust temperature of the flow of exhaust gases, diverting a portion of the flow of exhaust gases away from the one or more reheaters, and flowing the diverted portion of the flow of exhaust gases to an evaporator in the heat recovery steam generator.

The present application and the resultant patent further provide a gas turbine system. The gas turbine system may include a gas turbine engine producing a flow of exhaust gases, a heat recovery steam generator with a first high pressure reheater, a second high pressure reheater, and an high pressure evaporator in communication with the flow of exhaust gases, and a gas flow control system for diverting a first portion of the flow of exhaust gases away from the first high pressure reheater and the second high pressure reheater and back towards the high pressure evaporator.

These and other features and improvements of the present application and the resultant patent will become apparent to one of ordinary skill in the art upon review of the following detailed description when taken in conjunction with the several drawings and the appended claims.

DETAILED DESCRIPTION

Figure 1:
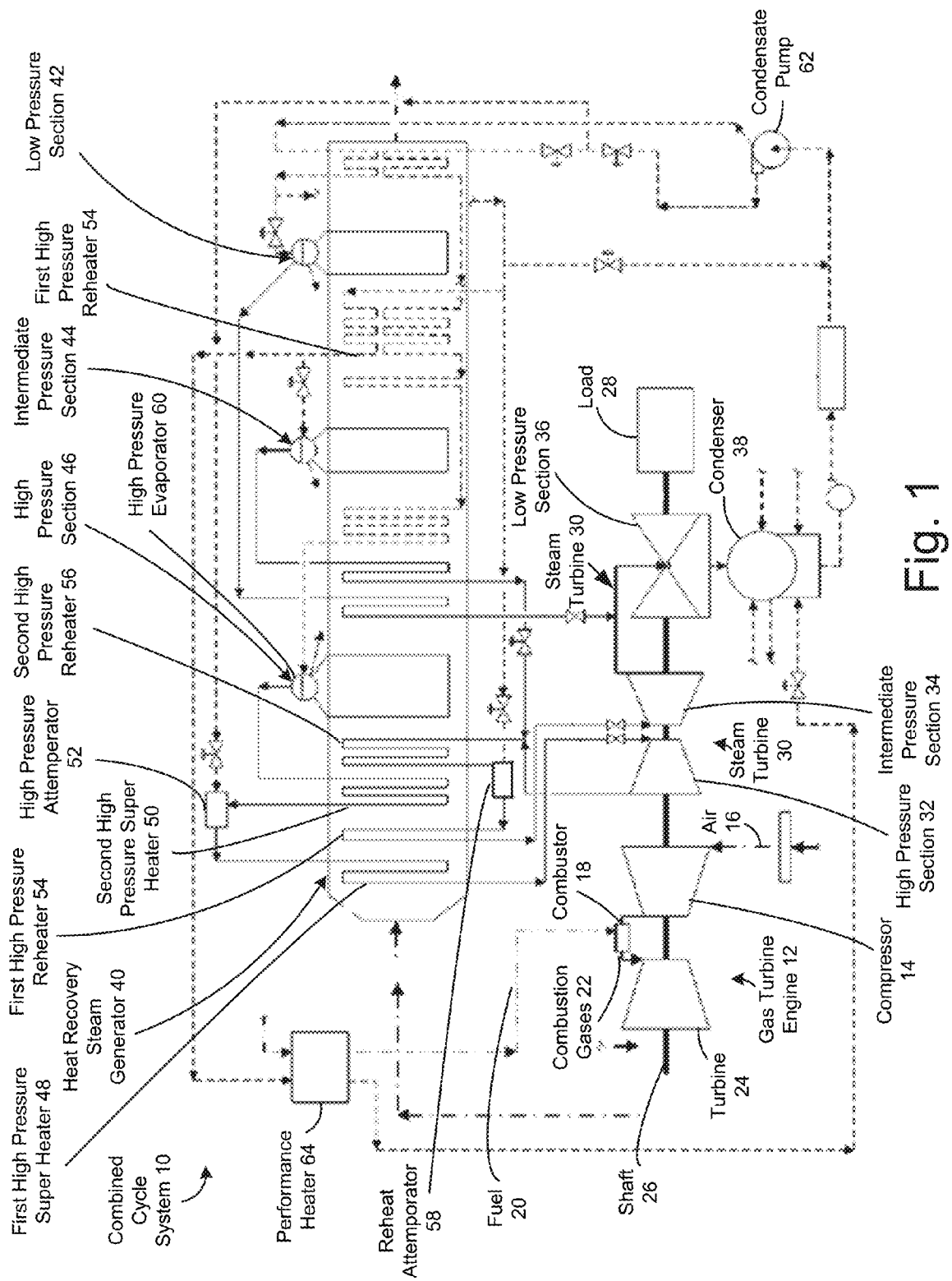
FIG. 1 is a schematic diagram of a gas turbine system such as a combined cycle system with a gas turbine engine, a steam turbine, and a heat recovery steam generator.

Referring now to the drawings, in which like numerals refer to like elements throughout the several views, FIG. 1 shows a schematic diagram of a combined cycle system 10. The combined cycle system 10 may include a gas turbine engine 12. The gas turbine engine 12 may include a compressor 14. The compressor 14 compresses an incoming flow of air 16. The compressor 14 delivers the compressed flow of air 16 to a combustor 18. The combustor 18 mixes the compressed flow of air 16 with a pressurized flow of fuel 20 and ignites the mixture to create a flow of combustion gases 22. Although only a single combustor 18 is shown, the gas turbine engine 12 may include any number of combustors 18. The flow of combustion gases 22 is delivered in turn to a turbine 24. The flow of combustion gases 22 drives the turbine 24 so as to produce mechanical work. The mechanical work produced in the turbine 24 drives the compressor 14 via a shaft 26 and an external load 28 such as an electrical generator and the like. The gas turbine engine 12 may use natural gas, various types of syngas, and other types of fuels. The gas turbine engine 12 may have different configurations and may use other types of components.

The combined cycle system 10 also may include a steam turbine 30. The steam turbine 30 may include a high pressure section 32, an intermediate pressure section 34, and one or more low pressure sections 36. The respective sections of the steam turbine 30 may have multiple steam admission points at different pressures. The low pressure section 36 may exhaust into a condenser 38. One or multiple shafts 26 may be used herein to drive the same or a different load 28. The steam turbine 30 may be of conventional design. Other configurations and other components also may be used herein.

The combined cycle system 10 also may include a heat recovery steam generator 40. The heat recovery steam generator 40 may include a low pressure section 42, an intermediate pressure section 44, and a high pressure section 46. Each section 42, 44, 46 generally includes one or more superheaters, reheaters, evaporators, economizers, and/or other components. In this example, and in addition to other components, the high pressure section 46 may include a first superheater 48, a second superheater 50, a high pressure attemperator 52, a first reheater 54, a second reheater 56, a reheat attemperator 58, and an evaporator 60. The other sections may include similar components. Feed water from the condenser 38 may be fed to the heat recovery steam generator 40 via a condensate pump 62. The heat recovery steam generator 40 may be of conventional design.

Generally described, the flow of feed water may be expanded and passed through the sections 42, 44, 46 of the heat recovery steam generator so as to exchange heat with the flow of combustion gases 22 from the gas turbine engine 12 to produce a flow of steam. The steam produced in the heat recovery steam generator 40 then may be used to drive the steam turbine 30. Depending upon ambient conditions, a flow of water from the low pressure section 42 and/or the condensate pump 62 may be used in the reheat attemperator 54 to control the temperature of the steam leaving the reheaters 54, 56. Likewise, a flow of water from the boiler feed pump 62 may be used in the high pressure attemperator 52 to control the temperature of the steam leaving the first superheater 48 or elsewhere. This description of the combined cycle system 10 is for the purpose of example only. Many other components and other configurations also may be used herein.

Figure 2:
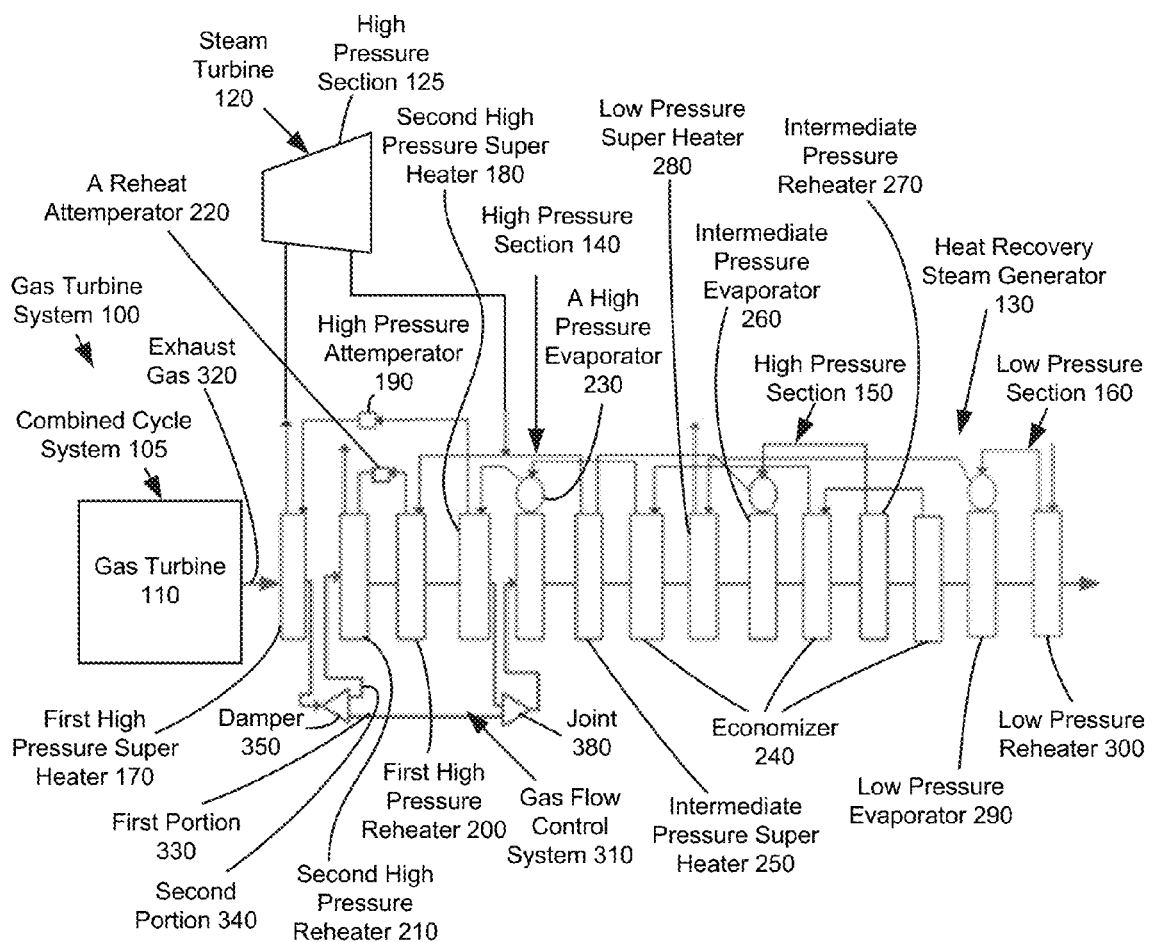
FIG. 2 is a schematic diagram of a portion of a gas turbine system such as a combined cycle system showing a heat recovery steam generator with a gas flow control system as may be described herein.

FIG. 2 shows a schematic diagram of a gas turbine system 100 as may be described herein. In this example, the gas turbine system 100 is shown as a combined cycle system 105. The gas turbine system 100, however, also may be an integrated gasification combined cycle system or any plant that produces steam at multiple pressure levels with an option for reheating.

Similar to the system described above, the combined cycle system 105 may include a gas turbine engine 110 and a steam turbine 120 of conventional design. The steam turbine may include a high pressure section 125 and other sections. Although a single shaft system is shown, multiple shaft configurations and the like also may be used herein.

The combined cycle system 105 also may include a heat recovery steam generator 130. The heat recovery steam generator 130 may include a high pressure section 140, an intermediate pressure section 150, and a low pressure section 160. The number of sections may vary. Each section of the heat recovery steam generator 130 may include a number of components. In this example, the high pressure section 140 may include a first high pressure superheater 170, a second high pressure superheater heat 180, a high pressure attemperator 190, a first high pressure reheater 200, a second high pressure reheater 210, a reheat attemperator 220, a high pressure evaporator 230, and a number of high pressure economizers 240. The intermediate pressure section 150 may include an intermediate pressure superheater 250, an intermediate pressure evaporator 260, and an intermediate pressure economizer 270. Likewise, the low pressure section 160 may include a low pressure superheater 280, a low pressure evaporator 290, and a low pressure economizer 300. The heat recovery steam generator 130 may be of conventional design. The term "heat recovery steam generator 130" encompasses any plant that produces steam at multiple pressure levels with an option for reheating. Other components and other configurations also may be used herein.

The combined cycle system 105 also may include a gas flow control system 310. The gas flow control system 310 may divert a flow of exhaust gas 320 into a first portion 330 that flows directly to the high pressure evaporator 230 and a second portion 340 that continues to flow through the high pressure reheaters 210, 200 and, optionally, the second high pressure superheater 180. The volume of the respective portions 330, 340 of the flow of exhaust gas 320 may vary upon ambient conditions, operating conditions, and other parameters. The portions 330, 340 may be varied statically or dynamically with feedback.

Figure 3:
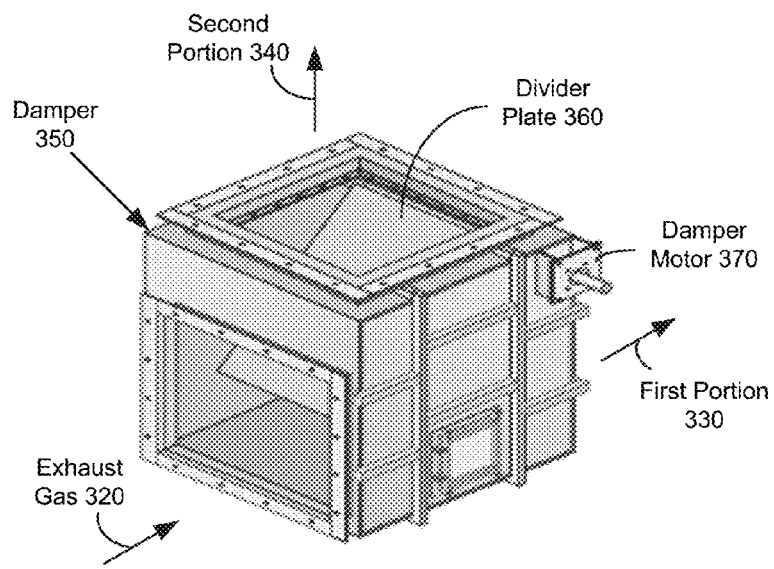
FIG. 3 is a perspective view of a damper as may be used with the reheat stray control system of FIG. 2.

The gas flow control system 310 may include a damper 350 positioned downstream of the first high pressure superheater 170. As is shown in FIG. 3, the damper 350 may include a divider plate 360. The divider plate 360 may be driven by a damper motor 370 or other type of positioning device. The damper 360 may have any size, shape, or configuration. The damper 350 may be any device that divides the flow of exhaust gas 320 into the first and second portions 330, 340. The damper 350 and the damper motor 350 may be controlled by the general gas turbine controls or other type of control device.

Figure 4:
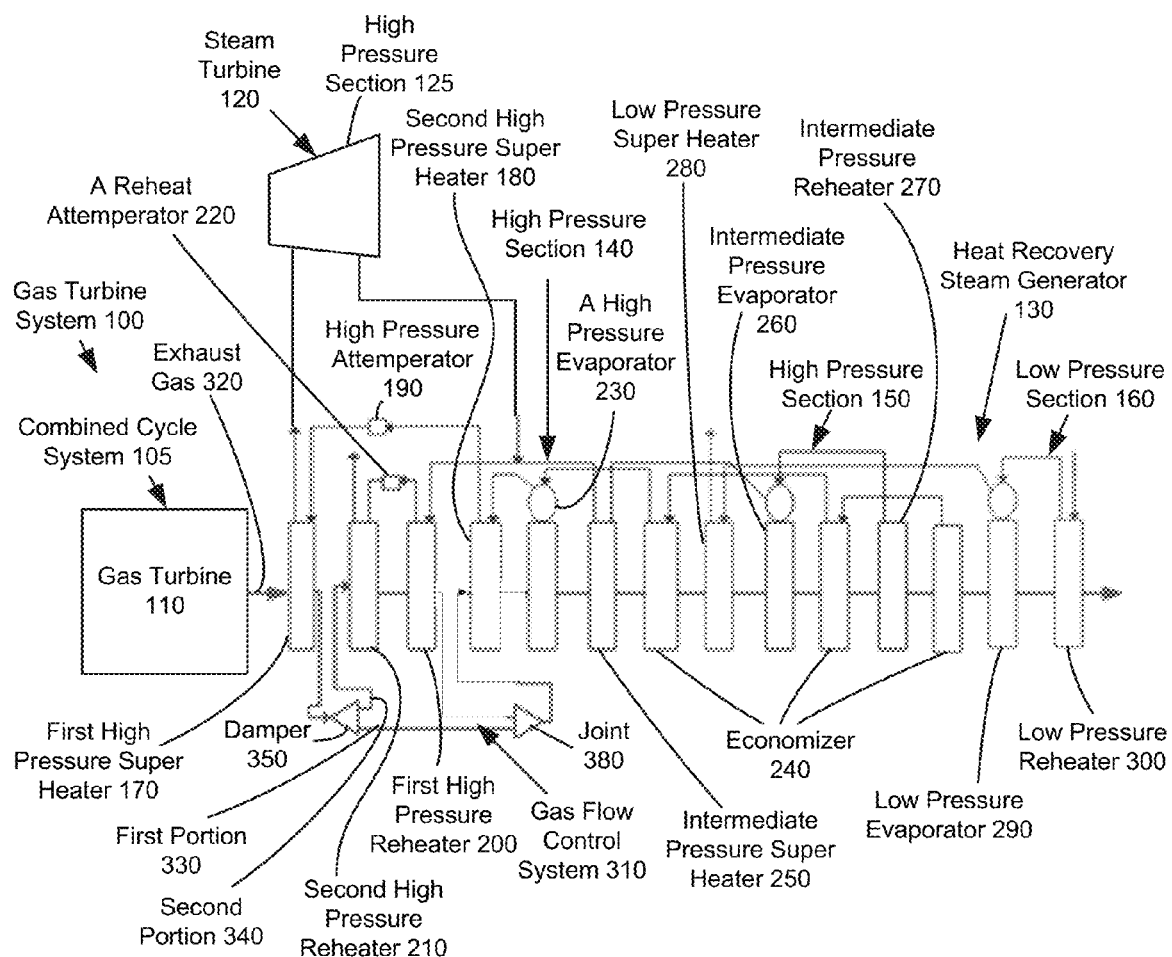
FIG. 4 is a schematic diagram of an alternative embodiment of a portion of a gas turbine system such as a combined cycle system showing a heat recovery steam generator with a gas flow control system as may be described herein.

The first portion 330 and the second portion 340 of the flow of exhaust gases 320 may merge downstream of the second high pressure superheater 180 at a joint 380. The joint 380 may be positioned upstream of the high pressure evaporator 230 or elsewhere. The joint 380 may be any structure that combines the portions 330, 340 of the flow of exhaust gases 320. Alternatively, the first portion 330 and the second portion 340 of the flow of exhaust gases 320 may individually flow to the high pressure evaporator 230 and merge therein. Further, the first portion 330 and the second portion 340 also may flow upstream of the second high pressure superheater 180 as is shown in FIG. 4. Other components and other configurations also may be used herein.

During partial load operations and the like, additional flows of attemperating water may be diverted to the reheat attemperator 220 so as to control the temperature of the steam leaving the reheaters 200, 210. This extra amount of steam generated by the reheaters 200, 210 bypasses the high pressure section 125 of the steam turbine 120 without producing useful work so as to reduce the overall performance of the combined cycle system 105. As the flow of water to the reheat attemperator 220 increases, the damper 350 of the gas flow control system 310 thus may open to divert the first portion 330 of the flow of exhaust gases 320 around the reheaters 200, 210 and the second high pressure superheater 180 directly to the high pressure evaporator 230. This increase in the flow of the exhaust gases 320 into the high pressure evaporator 230 produces more steam for use within the high pressure section 125 of the steam turbine 120 and, hence, produces more useful work therein.

Likewise, the diversion of the first portion 330 of the flow of exhaust gases 320 away from the reheaters 200, 210 reduces the temperature therein and, hence, reduces the need for further flows of attemperating water for improved overall efficiency. Moreover, steam from other sources may now be available to provide additional work elsewhere in the system. For example, steam may be provided to the performance heater 64 or elsewhere from an economizer or other type of section. Additional flows of steam also may be directed to the reheaters 210, 220, the attemperator 220 and the like from elsewhere.

The use of the gas flow control system 310 thus improves overall combined cycle performance at partial load operation and/or varying ambient conditions. Specifically, the gas flow control system 310 limits the need for attemperating water to control the temperature of the steam leaving the reheaters 200, 210. Additional diversion paths also may be used herein in any of the sections of the heat recovery steam generator 130 and elsewhere.

It should be apparent that the foregoing relates only to certain embodiments of the present application and the resultant patent. Numerous changes and modifications may be made herein by one of ordinary skill in the art without departing from the general spirit and scope of the invention as defined by the following claims and the equivalents thereof.

We claim:

1. A gas turbine system, comprising:
a gas turbine engine producing a flow of exhaust gases;
a heat recovery steam generator in communication with the flow of exhaust gases;
the heat recovery steam generator comprising a superheater, a reheater, and an evaporator; and
a gas flow control system comprising a damper disposed downstream of the superheater and upstream of the reheater and the evaporator relative to the flow of exhaust gases, wherein the damper bifurcates the flow of exhaust gases downstream of the superheater into a first portion that bypasses the reheater and a second portion that flows to the reheater.

2. The gas turbine system of claim 1, wherein the heat recovery steam generator comprises a high pressure section.

3. The gas turbine system of claim 1, wherein the reheater comprises a first high pressure reheater and a second high pressure reheater.

4. The gas turbine system of claim 3, wherein the heat recovery steam generator comprises a reheat attemperator in communication with the first high pressure reheater and the second high pressure reheater.

5. The gas turbine system of claim 1, wherein the superheater comprises a first superheater upstream of the reheater and a second superheater downstream of the reheater.

6. The gas turbine system of claim 5, wherein the heat recovery steam generator comprises an attemperator in communication with the first superheater and the second superheater.

7. The gas turbine system of claim 5, wherein the gas flow control system bypasses the second superheater.

8. The gas turbine system of claim 5, wherein the first portion of the flow of exhaust gases flows through the second superheater.

9. The gas turbine system of claim 1, wherein the damper comprises a divider plate.

10. The gas turbine system of claim 1, wherein the damper comprises a damper motor.

11. The gas turbine system of claim 1, wherein the gas flow control system comprises a joint downstream of the damper.

12. The gas turbine system of claim 1, further comprising a steam turbine in communication with the heat recovery steam generator and wherein the evaporator produces a flow of steam in communication with a high pressure section of the steam turbine.

13. A method of operating the gas turbine system of claim 1, comprising:
diverting the first portion to the evaporator in response to an increase in an exhaust temperature of the flow of exhaust gases.

14. A gas turbine system, comprising:
a gas turbine engine producing a flow of exhaust gases;
a heat recovery steam generator in communication with the flow of exhaust gases;
the heat recovery steam generator comprising a first high pressure superheater, a first high pressure reheater, a second high pressure reheater, and a high pressure evaporator; and
a gas flow control system comprising a damper disposed downstream of the first high pressure superheater and upstream of the first and second high pressure reheaters relative to the flow of exhaust gases, wherein the damper bifurcates the flow of exhaust gases downstream of the first high pressure superheater into a first portion that bypasses the first high pressure reheater and the second high pressure reheater and a second portion that flows to the high pressure reheater and the second high pressure reheater.

15. The gas turbine system of claim 14, wherein the heat recovery steam generator comprises a reheat attemperator in communication with the first high pressure reheater and the second high pressure reheater.

16. The gas turbine system of claim 14, wherein the first high pressure superheater is upstream of the first high pressure reheater, and wherein the heat recovery steam generator comprises a second high pressure superheater downstream of the second high pressure reheater.

17. The gas turbine system of claim 16, wherein the gas flow control system bypasses the second high pressure superheater.

18. The gas turbine system of claim 16, wherein the first portion of the flow of exhaust gases flows through the second high pressure superheater.

* * * * *